United States Patent
Hayashi

(10) Patent No.: US 9,873,213 B2
(45) Date of Patent: Jan. 23, 2018

(54) DIE REPAIRING METHOD AND METHOD FOR MANUFACTURING FUNCTIONAL FILM USING SAME

(71) Applicant: Sharp Kabushiki Kaisha, Osaka-shi, Osaka (JP)

(72) Inventor: Hidekazu Hayashi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 425 days.

(21) Appl. No.: 14/376,982

(22) PCT Filed: Feb. 7, 2013

(86) PCT No.: PCT/JP2013/052875
§ 371 (c)(1),
(2) Date: Aug. 6, 2014

(87) PCT Pub. No.: WO2013/118825
PCT Pub. Date: Aug. 15, 2013

(65) Prior Publication Data
US 2015/0015961 A1    Jan. 15, 2015

(30) Foreign Application Priority Data
Feb. 8, 2012   (JP) .................. 2012-024651

(51) Int. Cl.
*B29C 33/74*   (2006.01)
*B29D 11/00*   (2006.01)
(Continued)

(52) U.S. Cl.
CPC .............. *B29C 33/74* (2013.01); *B29C 33/72* (2013.01); *B29D 11/00278* (2013.01);
(Continued)

(58) Field of Classification Search
CPC ......... B29C 33/74; B29C 33/72; B29D 11/00; B29D 11/00278; B29D 11/00288; G02B 1/18; C25D 11/18
See application file for complete search history.

(56) References Cited

U.S. PATENT DOCUMENTS 7,360,749 B2 * 4/2008 Hirose .................. B29C 33/10
                                                          249/141
7,835,080 B2    11/2010 Taguchi et al.
(Continued)

FOREIGN PATENT DOCUMENTS

JP    H04161308 A    6/1992
JP    H06330350 A    11/1994
(Continued)

OTHER PUBLICATIONS

International Search Report PCT/ISA/210 for International Application No. PCT/JP2013/052875 dated May 14, 2013.

*Primary Examiner* — Mathieu Vargot
(74) *Attorney, Agent, or Firm* — Harness, Dickey & Pierce, P.L.C.

(57) ABSTRACT

This is a mold repairing method for removing a resin material deposited on a mold, of which the surface is a porous film with a plurality of recesses that have been created through anodization. The mold repairing method includes the steps of: (I) removing the resin material that is exposed on the surface of the mold over the plurality of recesses without performing atmospheric pressure plasma processing; and (II) removing at least partially the resin material that is still left inside the plurality of recesses by the atmospheric pressure plasma processing, after the step (I) has been performed, thereby recovering the original function of the mold.

13 Claims, 5 Drawing Sheets

(51) Int. Cl.
  *B29C 33/72* (2006.01)
  *G02B 1/118* (2015.01)
  *C25D 11/18* (2006.01)
  *B29C 33/58* (2006.01)
  *B29K 101/00* (2006.01)

(52) U.S. Cl.
  CPC ........ *B29D 11/00288* (2013.01); *C25D 11/18* (2013.01); *G02B 1/118* (2013.01); *B29C 33/58* (2013.01); *B29C 2033/725* (2013.01); *B29K 2101/00* (2013.01)

(56) References Cited

U.S. PATENT DOCUMENTS

2007/0116934 A1* 5/2007 Miller ................ C25D 1/10
                                                             428/172
2010/0119782 A1   5/2010 Ohgane
2010/0239783 A1* 9/2010 Mao ................ B29C 33/58
                                                             427/578

FOREIGN PATENT DOCUMENTS

| | | |
|---|---|---|
| JP | H11254454 A | 9/1999 |
| JP | 2003109757 A | 4/2003 |
| JP | 2004009559 A | 1/2004 |
| JP | 2005111775 A | 4/2005 |
| JP | 2006079988 A | 3/2006 |
| JP | 2006113127 A | 4/2006 |
| JP | 2010052175 A | 3/2010 |
| JP | 2010131985 A | 6/2010 |
| JP | 2013026603 A | 2/2013 |
| WO | WO-2006059686 A1 | 6/2006 |

* cited by examiner (a)

INTRODUCE GAS (b)

INTRODUCE GAS    SUCK GAS

BEFORE PROCESSING

AFTER PROCESSED FOR 11 MINUTES

DIE REPAIRING METHOD AND METHOD FOR MANUFACTURING FUNCTIONAL FILM USING SAME

TECHNICAL FIELD

The present invention relates to a mold (die) repairing method and a method of making a functional film using the method, and more particularly relates to a method of repairing a mold which has a porous film on its surface.

BACKGROUND ART

Recently, various kinds of optical elements with a very small structure, of which the feature size is as small as the wavelength of visible light (that falls within the range of about 380 nm to about 780 nm) and which is sometimes called a "sub-wavelength structure (SWS)", have been developed. If an uneven pattern, of which the feature size is equal to or smaller than the wavelength of incoming light, is formed on the surface of a substrate, then reflection of the light from the surface can be reduced. The size of those recesses and projections that form such an uneven pattern may be set to fall within the range of 10 nm to less than 500 nm, for example.

Among other things, an antireflection technology based on the principle of a moth-eye structure has attracted a lot of attention these days. With the moth-eye structure, the refractive index can be changed virtually continuously in those recesses' or projections' depth (or height) direction. That is to say, the surface with the moth-eye structure has no interfaces which have substantive refractive index differences in the light traveling direction, and therefore, can reduce the reflection of light effectively enough.

The moth-eye structure is advantageous because the structure not only performs an antireflection function with small incident angle dependence over a wide wavelength range but also is applicable to a lot of materials and contributes to forming an uneven pattern on the substrate directly. That is why by adopting the moth-eye structure, a high-performance antireflection film can be provided at a lower cost.

The moth-eye structure may be formed using an anodized porous alumina layer (porous oxide film) which is obtained by anodizing an aluminum base (see Patent Document No. 1, for example). Hereinafter, such an anodized porous alumina layer obtained by anodizing an aluminum base will be described briefly.

If an aluminum base is immersed in an acidic electrolytic solution of sulfuric acid, oxalic acid, phosphoric acid, or any other appropriate acid, and if a voltage is applied thereto using the aluminum base as an anode, oxidation and dissolution will advance concurrently on the surface of the base. As a result, an oxide film with a huge number of nanopores (i.e., a porous aluminum layer) is formed over the surface of the base.

Those nanopores will be formed in the shape of circular cylinders perpendicularly to the oxide film. In addition, if the anodization process is carried out under a predetermined condition, those nanopores will get self-organized and arranged in a regular pattern. Consequently, by performing such an anodization process on aluminum, a very small structure with various regular patterns can be formed relatively easily and cost-effectively.

The applicant of the present invention discloses, in Patent Document No. 1, a method of forming an antireflection film (antireflective surface) using a stamper which has an anodized porous alumina film over its surface. Patent Document No. 1 also discloses a technique for forming an antireflection film using an alumina layer, of which the very small recesses have a stepped side surface.

If the porous alumina film is used, a mold for forming a moth-eye structure on the surface (which will be referred to herein as a "moth-eye mold") can be made easily. In particular, as disclosed in Patent Document 1, if the surface of the anodized aluminum film is used as a mold as it is, the manufacturing cost can be cut down significantly, which is beneficial.

An antireflection film can be made just by pressing the moth-eye mold against a photocurable resin that has been applied onto a transparent film, for example. More specifically, the uneven surface of the moth-eye mold is pressed against the photocurable resin in a vacuum. Then, the photocurable resin is irradiated with an ultraviolet ray with the moth-eye mold still pressed against it. After that, when cured, the resin is released from the moth-eye mold. Such a method of transferring the surface shape of a mold onto a resin while curing the resin with an ultraviolet ray is called a "UV imprinting technique".

CITATION LIST

Patent Literature

Patent Document No. 1: PCT International Application Publication No. 2006/059686
Patent Document No. 2: Japanese Laid-Open Patent Publication No. 2004-009559
Patent Document No. 3: Japanese Laid-Open Patent Publication No. 11-254454
Patent Document No. 4: Japanese Laid-Open Patent Publication No. 2005-111775
Patent Document No. 5: Japanese Laid-Open Patent Publication No. 2003-109757
Patent Document No. 6: Japanese Laid-Open Patent Publication No. 2006-79988
Patent Document No. 7: Japanese Laid-Open Patent Publication No. 2006-113127

SUMMARY OF INVENTION

Technical Problem

If such a process step of transferring the surface shape onto a resin using a mold is continued, the resin is likely to be left on the surface of the mold, particularly in its recesses, thus causing so-called "resin clogging". Such a resin-clogged mold can no longer be used to form a product in an intended shape.

Even when a moth-eye film is made by the UV imprinting technique, the resin clogging will also arise (i.e., there will also be defective portions) on the moth-eye mold. To avoid resin clogging, the moth-eye mold is usually coated with fluorine (which is a mold releasing agent). However, as the molding process step is carried out an increasing number of times, the mold releasing agent will be consumed soon and the number of those defective portions will increase. According to conventional technologies, a moth-eye mold that has come to have such defective portions has been either thrown away or at least subjected to some recycling process by cutting or etching its surface, thus causing an increase in the cost of making a moth-eye film.

To increase the mass productivity and cut down the manufacturing cost, the resin left on the mold should be removed appropriately. Nevertheless, in the case of a mold with a very fine surface topography such as a moth-eye mold to be formed using a porous alumina layer, it is not easy to remove the residual resin from the surface.

Patent Document No. 2 discloses a method for removing foreign matter such as resin from a mold. According to that method, the foreign matter left on the mold is adsorbed onto a thermoplastic resin, and then impact is applied to the thermoplastic resin, thereby removing the thermoplastic resin along with the foreign matter. A thermoplastic resin is supposed to be used according to that method. However, if what should be removed is an organic substance, then the organic substance could be removed either by being exposed to an inert gas which is highly reactive to the organic substance or being collided against some solid matter.

Even when such a method is adopted, however, it is still very difficult to remove the resin material appropriately from inside pores or between the projections and recesses in a mold with a lot of nanopores such as the moth-eye mold. That is to say, even if the resin left on the surface of the mold has been removed successfully, it is difficult to remove the resin that has adhered to the inner wall of pores with as small a diameter as about a few hundred nm, for example, just by applying physical impact to it. For these reasons, there has been an increasing demand for a method for repairing appropriately a moth-eye mold or any other mold, of which the surface is a porous film, by removing the residual resin from the mold. It should be noted that not only when a moth-eye mold is used but also when any other mold, of which the surface is a porous film having very small recesses of a sub-micro or nanometer scale, is used, a resin material left on the mold should also be removed appropriately.

The present inventors perfected our invention in order to overcome these problems by providing a mold repairing method, by which a mold with a porous surface where there are a lot of very small recesses can have its mold function regained by appropriately removing the residual resin material from the mold.

Solution to Problem

A mold repairing method according to an embodiment of the present invention is a method for removing a resin material deposited on a mold, of which the surface is a porous film with a plurality of recesses that have been created through anodization. The method includes the steps of: (I) removing the resin material that is exposed on the surface of the mold over the plurality of recesses without performing atmospheric pressure plasma processing; and (II) removing at least partially the resin material that is still left inside the plurality of recesses by the atmospheric pressure plasma processing, after the step (I) has been performed.

In one embodiment, the mold includes an aluminum material and the porous film includes a porous alumina layer.

In one embodiment, in the step (II), the resin material that is partially left on the mold is subjected to the atmospheric pressure plasma processing just locally.

In one embodiment, the step (I) includes removing the resin material by chemical treatment.

In one embodiment, the step (I) includes removing the resin material by spraying dry ice.

In one embodiment, the step (I) includes removing the resin material by laser ablation.

In one embodiment, the surface of the mold is comprised of curved surfaces.

In one embodiment, a mold releasing agent has been applied onto the surface of the mold.

A mold according to an embodiment of the present invention has been repaired by a repairing method according to any of the embodiments described above.

A moth-eye film according to an embodiment of the present invention has been made using the mold that has been repaired as described above.

A method of making a functional film according to an embodiment of the present invention includes the steps of: providing a mold, of which the surface is a porous film with a plurality of recesses that have been created by anodization; imprinting the surface shape of the mold onto a photocurable resin material; removing, after the step of imprinting, the photocurable resin material that has been deposited on the mold; and imprinting, after the step of removing the resin material deposited, the surface shape of the mold onto the photocurable resin again. The step of removing the photocurable resin material includes the steps of: (I) removing the resin material that is exposed on the surface of the mold over the plurality of recesses without performing atmospheric pressure plasma processing; and (II) removing at least partially the resin material that is still left inside the plurality of recesses by the atmospheric pressure plasma processing, after the step (I) has been performed.

In one embodiment, the step of providing the mold includes applying a mold releasing agent onto the surface of the porous film.

Advantageous Effects of Invention

According to an embodiment of the present invention, a mold, of which the surface is a porous film, can be repaired appropriately. According to an embodiment of the present invention, a moth-eye mold with a porous alumina layer, for example, can be repaired appropriately, and therefore, the mass productivity of a functional film such as a moth-eye film can be increased and its manufacturing cost can be cut down.

DESCRIPTION OF EMBODIMENTS

In the following description of embodiments, the present invention is supposed to be applied to making a moth-eye film by imprinting a moth-eye mold, of which the surface is a porous alumina layer obtained by anodization, onto a UV curable resin with an ultraviolet ray. However, this is only an example of the present invention.

First of all, it will be described how the present inventors studied resin clogging to be caused by using a moth-eye mold and how the resin could be removed as a result of experiments the present inventors carried out.

A moth-eye mold is often used with a mold releasing agent applied onto its surface. As the mold releasing agent, typically a fluorine based material (such as Fluorosurf produced by Fluoro Technology) is used. Compared to other mold releasing agents (such as a silicone based mold releasing agent), the fluorine based mold releasing agent contributes more effectively to removing a UV curable resin, which is one of its advantages. In addition, the fluorine-based mold releasing agent is highly resistant to an ultraviolet ray, which is another advantage thereof.

However, even if such a mold releasing agent is applied, the degree of adhesion between the moth-eye mold and the resin will gradually increase as the mold releasing agent is consumed, for example. As a result, the resin will soon be partially left on the moth-eye mold after the film is peeled off. For example, when a roll-shaped moth-eye mold with a size of about a few millimeters, a radius of a few ten centimeters, and a width of approximately 1 m (see FIG. 9) is used, such residual resin will be observed at 20-30 spots per 1000 m processed. The mold releasing agent could be re-applied before the residual resin starts to adhere. When a roll-shaped mold is used, however, it is not easy to re-apply the mold releasing agent.

According to the study the present inventors carried out, the foreign matter (such as resin) that has adhered as a residue to a moth-eye mold is roughly comprised of two layers. Specifically, the first layer is a thick film of a UV resin which has adhered onto the surface of the mold and then cured there and which may have a thickness of about 5 μm to about 10 μm, for example. On the other hand, the second layer would get caught in very small recesses of a porous alumina layer, in particular, and could include a UV resin only, the UV resin and a mold releasing agent in combination, or a reactant of the UV resin and alumina in the form of a thin film. Considering the size of the very small recesses, the second layer should have a thickness of a few micrometers or less.

Figure 1:
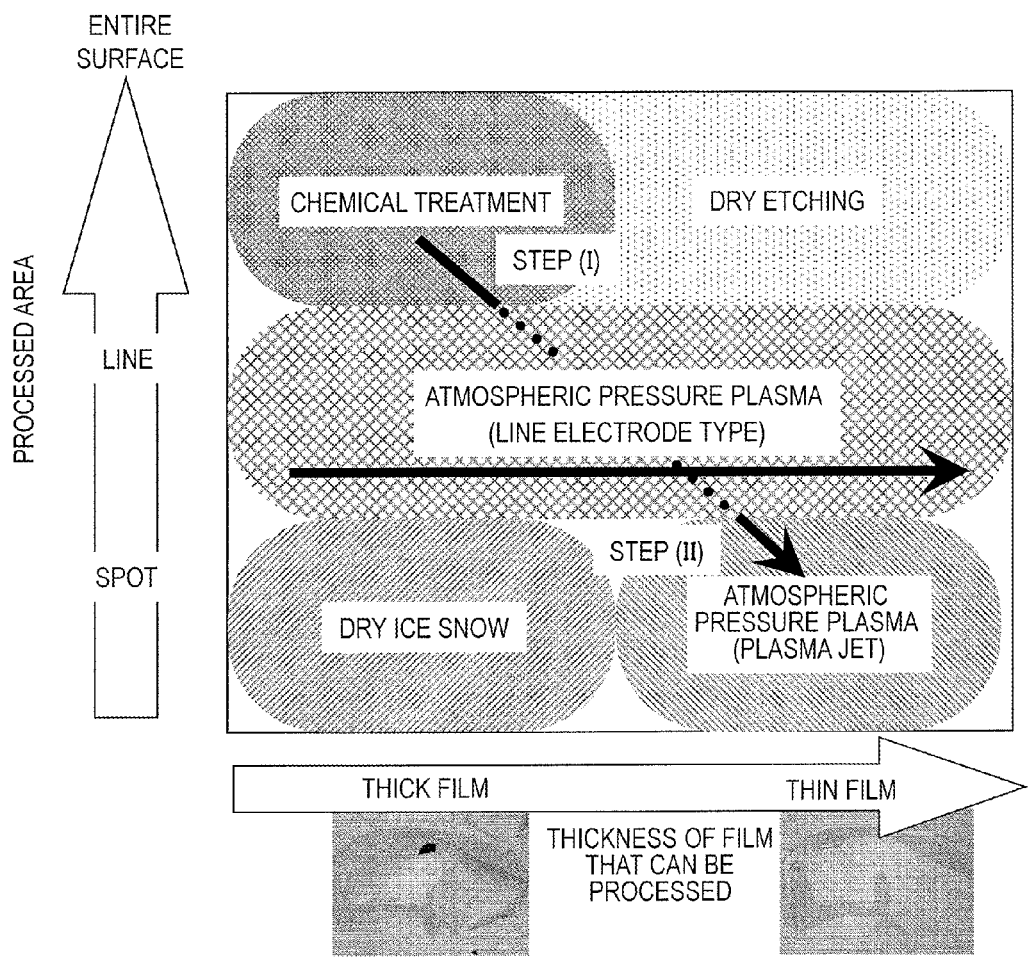
FIG. 1 Shows relations between the thickness of a film that can be removed (as represented by the abscissa) and the area processed (as represented by the ordinate) in various resin film removing processes.

The present inventors tentatively applied various removing methods to such residual resin comprised of a thick film and a thin film. FIG. 1 shows the results of experiments obtained by the present inventors by applying those various removing methods. In FIG. 1, the abscissa represents the thickness of the film that could be removed and the ordinate represents the area processed.

As shown in FIG. 1, a chemical (remover) treatment is suited to removing a thick film but is not suited to removing a thin film. The reason is that if a thin film were tentatively removed by chemical treatment, then the damage to be done on the mold would increase. That is why a chemical treatment is suitably used to remove a thick film from the surface but should not be used to remove a thin film. Likewise, when a dry ice snow treatment was adopted, a thick film could be removed but a thin film could not be removed. In a moth-eye mold, its surface has nanometer-scale (or sub-micron-scale) recesses. For that reason, to physically remove the resin clogged in such tiny recesses by making other particles collide against it, particles with a smaller diameter should be used. However, the dry ice snow has a particle size of a few hundred micrometers, and therefore, it can be seen that the dry ice snow treatment is not suited to removing a thin film, either.

On the other hand, according to a dry treatment such as an ICP (inductively coupled plasma) dry etching process or atmospheric pressure plasma processing, the selectivity of the material to etch can be increased depending on the kind of the gas to be introduced. Also, depending on the condition, a thick film can also be removed.

Nevertheless, when a dry etching process is carried out using a general plasma etching system of the ICP type, for example, the entire surface is subjected to that process, and therefore, even a portion with no residual resin at all is also subjected to the plasma etching process. That is why if the resin is left only locally on the mold and yet if the entire surface were subjected to the process, the surface of the mold would be roughened unnecessarily, which is not beneficial. On top of that, in a general plasma etching system, the process is ordinarily carried out in a vacuum chamber, thus requiring a bulky processing system and a large number of processing steps, which can be a problem, too.

Meanwhile, if atmospheric pressure plasma processing is adopted, the resin can be removed relatively easily. Also, if a known spotted atmospheric pressure plasma (plasma jet) system is used, only that locally left residual resin can be processed without subjecting the entire surface to the plasma processing unnecessarily. Such a mold cleaning process using atmospheric pressure plasma processing is disclosed in Patent Document No. 4, for example. A plasma jet system is disclosed in Patent Document No. 5.

Figure 2:
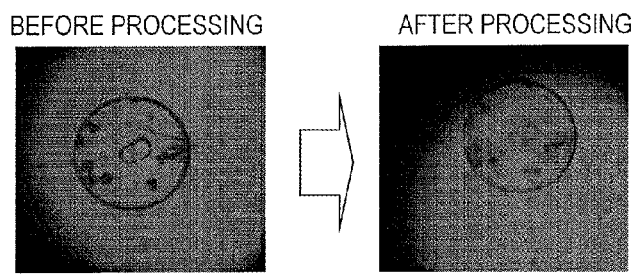
FIG. 2 Shows the appearances of the surface before and after a resin film is removed by atmospheric pressure plasma processing.

However, the present inventors discovered and confirmed via experiments that when a thick film was going to be removed by the atmospheric pressure plasma processing (plasma jet processing), the resin film removing rate started to decrease significantly halfway through the processing. That is to say, as the remaining portion of the residual resin decreased, it became more and more difficult to further advance the removing process. As a result, the plasma processing had to be carried out for a long time, after all. In addition, as shown in FIG. 2, even if the atmospheric pressure plasma processing is carried out for a relatively long time, sometimes the resin will be still left here and there.

The mold should not be subjected to plasma processing for a long time (e.g., for 60 minutes or more). The reason is that the longer the plasma processing time, the stronger the chances of generating arc discharge. Once arc discharge occurred, huge damage would be done on the moth-eye mold. That is to say, if plasma processing were carried out for a long time, the resin would not be removed efficiently and the chances of getting the mold damaged would increase, too. Consequently, it is not recommended that the residual resin be removed only by the atmospheric pressure plasma processing.

As described above, if a person tried to remove the residual resin from a mold with nanopores on its surface at a time by a single (kind of) process, the resin would still be left or damage would be done on the mold. Particularly, if there are such nanopores or very fine topography on the surface of the mold as in a moth-eye mold, formed products with required shape precision would not be obtained any-more (i.e., the function of the mold would be lost) after the foreign matter is removed. As a result, the mass productivity of the formed products would decrease significantly.

However, the present inventors discovered that if the residual resin deposited outside of those nanopores is removed first by any appropriate treatment (such as a chemical treatment, a dry ice snow treatment or laser ablation treatment) other than atmospheric pressure plasma processing and then the resin left inside those nanopores is removed by atmospheric pressure plasma processing, the resin can be removed appropriately with the damage on the mold minimized.

That is to say, in a repairing method according to an embodiment of the present invention, first of all, the mold is subjected to a resin removing process other than atmospheric pressure plasma processing, and then subjected to the atmospheric pressure plasma processing. By performing such a two-stage removing process, even a mold having very small pores (or surface topography) on its surface such as a moth-eye mold can also be repaired appropriately. Particularly, the mold repairing process is suitably carried out as one of the following three combinations (1), (2) and (3) of first- and second-stage processes (steps (I) and (II):

(1) step (I): chemical (remover) treatment (wet process) and step (II): atmospheric pressure plasma processing,
2) step (I): dry ice snow treatment and step (II): atmospheric pressure plasma processing, and
(3) step (I): laser ablation process and step (II): atmospheric pressure plasma processing.

By performing any of these first-stage treatments as step (I), the surface portion (thick film) of the resin left on the surface of the mold can be removed. For that reason, the remaining thin-film resin (or the resin and the mold releasing agent or a compound of the resin and alumina) can be removed by performing the atmospheric pressure plasma processing as the following step (II) for a relatively short time without doing damage on the surface of the mold. The atmospheric pressure plasma processing is suitably carried out to the point that the mold releasing agent is not removed.

Alternatively, spotted atmospheric pressure plasma processing may be carried out just locally on the resin that is left only partially. Such spotted atmospheric pressure plasma processing may be carried out using a known scanning micro-plasma jet etching system, for example.

In each of these processes (1) to (3), atmospheric pressure plasma processing is adopted as the second-stage process. However, the present inventors confirmed that if only the atmospheric pressure plasma processing was carried out for a long time, the mold got damaged due to generation of arc discharge or due to the influence of thermions or oxygen plasma. For that reason, in an embodiment of the present invention, the atmospheric pressure plasma processing is supposed to be preceded by a first-stage process which uses a different technique from the atmospheric pressure plasma processing.

The present inventors carried out, as experiments, dry etching processes using an ICP type plasma generator and an atmospheric pressure plasma processor (of a line electrode type). The results of the experiments are shown in FIGS. 3 and 4 for your reference.

Figure 3:
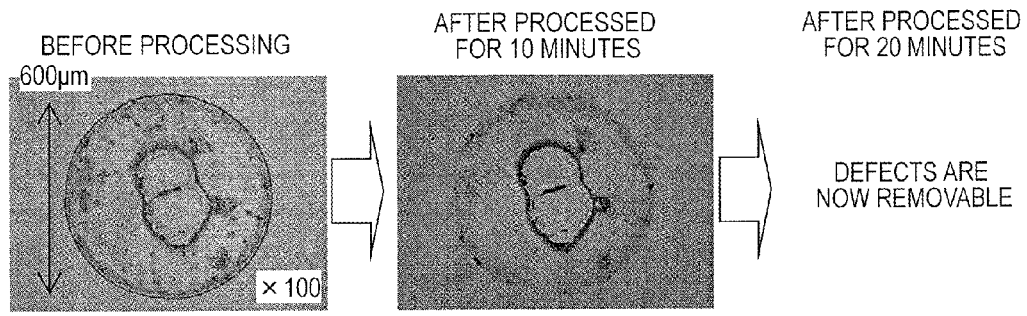
FIG. 3 Shows the appearances of the surface before and after a resin film is removed by CIP plasma etching.

FIG. 3 shows how a dry etching process was carried out using the ICP type plasma generator. In this example, the etching process was carried out under the condition including a Gap between the plasma generation source and the surface processed of 200 mm, an in-chamber pressure of 20 mTorr, and a radio frequency power of 1000 W, and the resin was removed by supplying an $O_2$ gas as a reactive gas at a flow rate of 1000 sccm. As can be seen from FIG. 3, when the ICP type plasma generator was used, the residual resin could be removed in 20 minutes. However, as described above, since a general dry etching process is carried out in a vacuum chamber, a special kind of equipment should be provided depending on the shape and size of the mold. Also, if the entire mold were subjected to the plasma processing, damage could be done on the entire mold due to the heat of reaction. For these reasons, according to an embodiment of the present invention, the atmospheric pressure plasma processing is adopted instead of such a dry etching process of the ICP type, for example.

Figure 4:
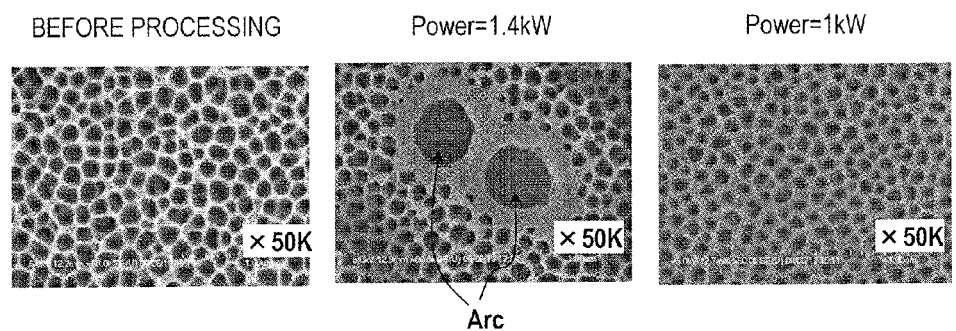
FIG. 4 Shows the damage that could be caused to a mold by arc discharge when a resin film is removed by atmospheric pressure plasma processing.

FIG. 4 shows the results obtained when the resin removing process was carried out by atmospheric pressure plasma processing (of a line electrode type). As shown in FIG. 4, when the atmospheric pressure plasma processing was carried out for a relatively long time at a relatively high radio frequency output of 1.4 kW, damage Arc caused by arc discharge was observed on the mold. On the other hand, if the atmospheric pressure plasma processing is carried out at a lower output (of 1 kW) for the same period of time, the quantity of heat applied to the mold will decrease, and therefore, the chances of doing damage due to arc discharge can be decreased. Even so, the atmospheric pressure plasma processing should not be carried out for a long time, either, because arc discharge could still be generated. For these reasons, the atmospheric pressure plasma processing is suitably carried out just for a short time. It should be noted that if the line electrode type process is carried out, even resin-free portions of the mold could be roughened unnecessarily.

Hereinafter, embodiments of the present invention will be described. It should be noted, however, that the embodiments to be described below are just an example and the present invention is in no way limited to such illustrative embodiments. In the following description, a method for repairing a moth-eye mold, of which the surface is a porous alumina layer (and which will be sometimes simply referred to herein as a "mold"), will be described. The moth-eye mold may have either a flat plate shape or a roll shape.

<Embodiment 1>

In a first embodiment, a chemical treatment is carried out as the first-stage treatment (step (I)) and atmospheric pressure plasma processing is carried out as the second-stage treatment (step (II)).

First of all, the chemical treatment as step (I) will be described. This chemical treatment may be carried out using one of the following two removers A and B.

(Remover A)
70% of monoethanolamine and
30% of DMSO (dimethyl sulfoxide)

Figure 5:
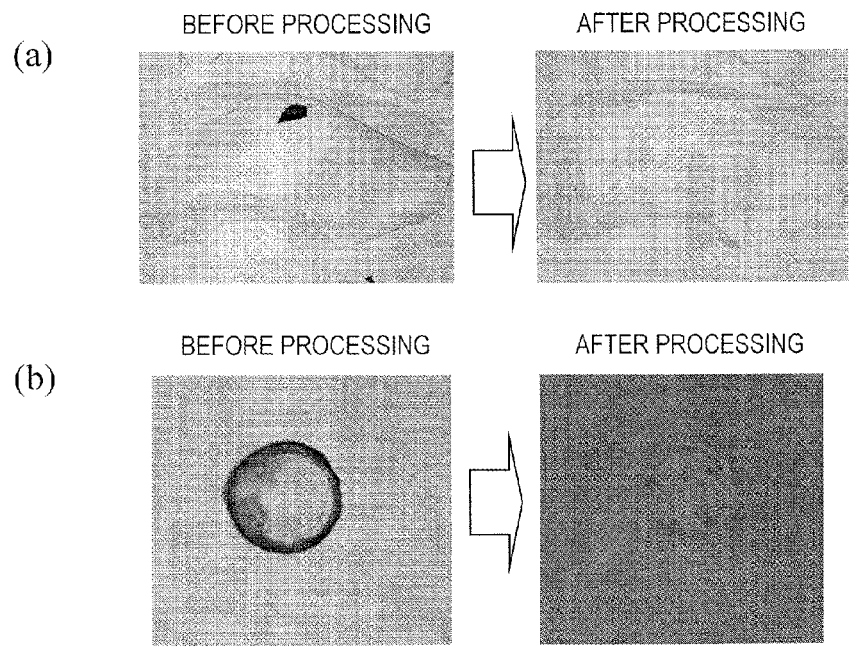
FIGS. 5 (a) and (b) show the appearances of a surface before and after a resin film is removed by chemical treatment.

Using this remover A, the mold was processed under the condition that the mold was brought into contact with (i.e., immersed in) the remover, of which the temperature was set to be 95° C., for 10 minutes. As a result, most of the resin on the surface of the mold could be removed without causing damage on the surface of the mold. FIG. 5(a) shows the surface of the mold yet to be treated and the treated surface of the mold in a situation where the resin was removed with this remover A. As can be seen from FIG. 5(a), the surface resin can be removed through the chemical treatment but the resin (or a compound of the resin and a mold releasing agent) that has adhered onto the unevenness of the mold is still left there.

It should be noted that the resin left on the porous alumina layer may have a thickness of about 5 to 10 μm and a size (diameter) of a few millimeters to several centimeters. Most of the resin with such a thickness would be removed through the first-stage process and the residual resin will be left as a thin film inside the recesses of the porous alumina layer. Such a residual resin still left after the first-stage process would have a thickness of a few ten nanometers to several micrometers.

(Remover B)

60% of aromatic hydrocarbon,

20% of phenol, and

20% of alkylbenzene sulfoxide

Using this remover B, the mold was cleaned under the processing condition that the mold was processed with this remover at a temperature of 150° C. for 40 minutes. As a result, most of the resin on the surface of the mold could be removed without causing damage on the surface of the mold. FIG. 5(b) shows the surface of the mold yet to be treated and the treated surface of the mold in a situation where the resin was removed with this remover B. As can be seen from FIG. 5(b), the surface resin can be removed through the chemical treatment but the resin (or a compound of the resin and a mold releasing agent) is still partially left.

In this case, if a person tried to remove the resin completely using one of these removers A and B, then the surface topography with a size of 10 to 500 nm that has been created on the surface of the mold would be deformed. For that reason, this process step should not be carried out until the resin is removed completely.

Also, if the mold has a large size, for example, sometimes it is not easy to immerse the entire mold in the chemical. In that case, the resin may also be removed by dripping the chemical onto an area on which the resin has adhered using an inkjet device, and then the entire mold may be cleaned.

After that, atmospheric pressure plasma processing is carried out as step (II).

Figure 6:
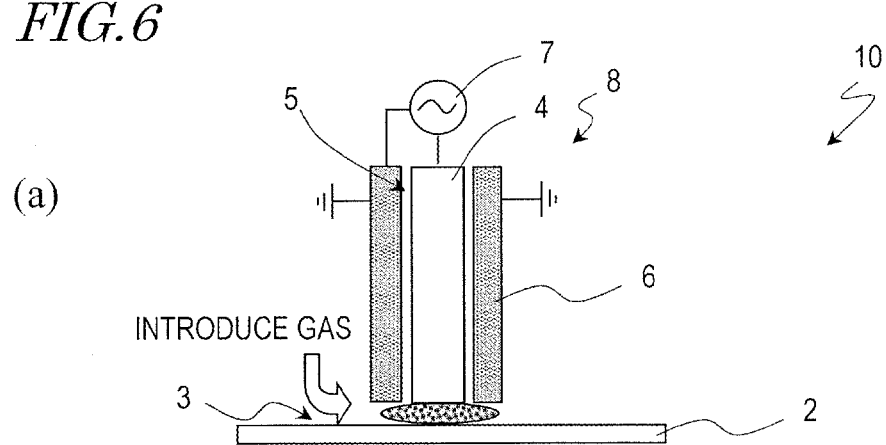
FIGS. 6 (a) and (b) are cross-sectional views illustrating atmospheric pressure plasma processors according to embodiments of the present invention.
Figure 6:
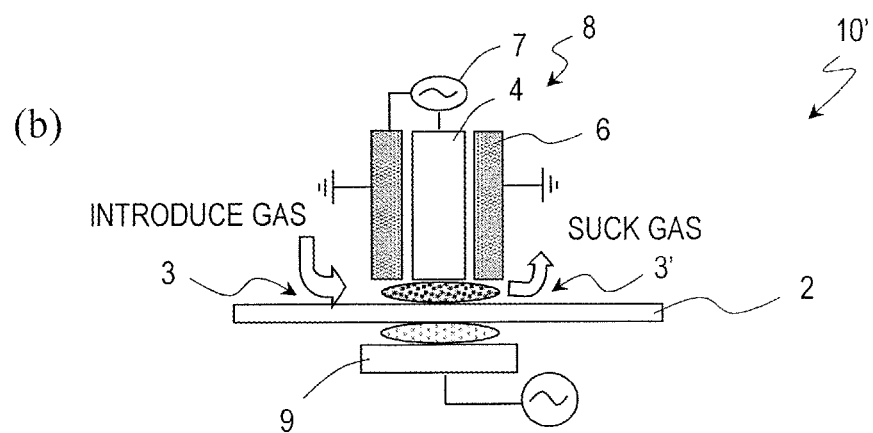

FIG. 6(a) illustrates a configuration for an atmospheric pressure plasma processor 10 for use in an embodiment of the present invention. The atmospheric pressure plasma processor 10 includes an electrode unit 8 and a reactive gas supply port 3 which is connected to a reactive gas supply line (not shown). The reactive gas supply line may be connected to a gas tank or a flow rate controller, for example.

The electrode unit 8 includes an inner electrode 4, an insulator 5, and an outer electrode 6. The outer electrode 6 faces the inner electrode 4 with the insulator 5 interposed between them, and the inner and outer electrodes 4 and 6 are connected to a power supply 7. The outer electrode 6 is also connected to the ground.

A reactive gas to generate plasma is supplied through the reactive gas supply line and the reactive gas supply port 3 to the space between the electrode unit 8 and the (surface of the) mold 2. In this case, if the tip of the inner electrode 4 is arranged more distant from the mold 2 than the tip of the outer electrode 6 is, plasma can be generated effectively without disturbing the gas flow.

On the other hand, FIG. 6(b) illustrates an atmospheric pressure plasma processor 10' as a modified example. This atmospheric pressure plasma processor 10' includes not only every member of the plasma processor 10 described above but also a gas suction port 3' and another electrode 9 which is arranged at the rear of the mold 2.

By providing the gas suction port 3', the plasma can be generated in an even narrower range, thus making it even easier to get the plasma processing done just locally only on the targeted area (i.e., to get spotted plasma processing done). In addition, by causing electrical discharge with the additional electrode 9 provided, it is possible to prevent arc discharge, which would do damage on the mold, from being generated.

As such an atmospheric pressure plasma processor for carrying out plasma processing just locally on the mold, the plasma jet generator disclosed in Patent Document No. 5 may be used, for example. Alternatively, the plasma processor disclosed in Patent Document No. 6 may also be used effectively. In any case, when the atmospheric pressure plasma processing was carried out for 20 minutes, the foreign matter such as the residual resin could be removed completely and the mold could be repaired perfectly.

<Embodiment 2>

In a second embodiment, a dry ice spraying process (dry ice snow treatment) is carried out as the resin removing process as step (I).

Figure 7:
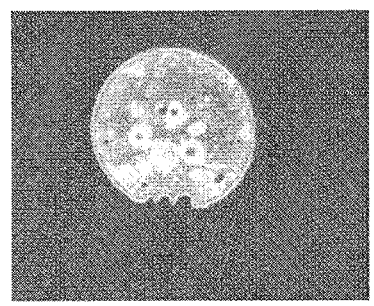
FIG. 7 Shows the appearances of the surface before and after a resin film is removed by spraying dry ice snow.
Figure 7:
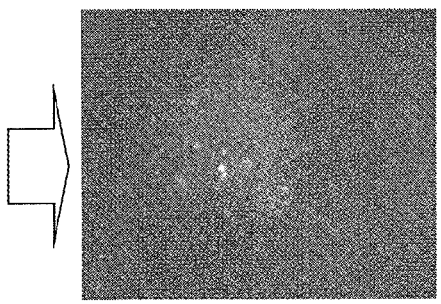

The dry ice snow treatment may be carried out using the system disclosed in Patent Document No. 3, for example. The dry ice snow treatment may be performed for 11 minutes using liquid $CO_2$, for example. FIG. 7 shows the surface of the mold yet to be treated and the treated surface of the mold.

After that, atmospheric pressure plasma processing is carried out as step (II) that is the second-stage process. The atmospheric pressure plasma processing may be carried out in the same way as in the first embodiment described above. For example, spotted processing may be carried out in a static state on an area where the resin is still left with the gap between the nozzle and the substrate set to be 13.5 mm and with the air flow rate set to be 25 liters/min. Optionally, the plasma processing may be carried out discontinuously. For example, a process step in which the plasma processing is performed for 10 seconds and then a cooling process is performed for 10 seconds may be repeatedly carried out 30 times.

Even with such a method adopted, if the resin material that has been deposited (as a thick film) on the surface of the mold is removed in advance through the dry ice snow treatment, the mold can also be repaired appropriately through the second-stage atmospheric pressure plasma processing.

<Embodiment 3>

In a third embodiment, a process of removing the resin by irradiating it with a laser beam (i.e., a laser ablation process) is carried out as the first-stage resin removing process. If such a laser ablation process is carried out as the first-stage process, the resin that is locally left on the mold can be removed easily, and therefore, the damage to be done on the mold can be reduced significantly, as will be described later.

Figure 8:
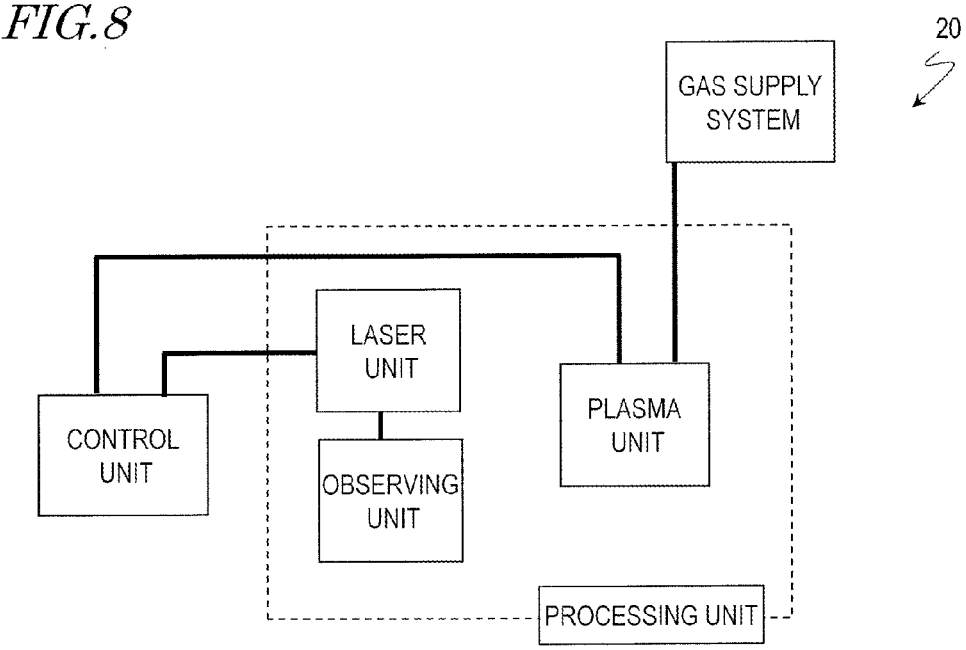
FIG. 8 A block diagram illustrating a configuration for a repairing system according to an embodiment of the present invention.

FIG. 8 illustrates a configuration for a repairing system (removing processor) 20 including a laser beam generator for use in this third embodiment. This repairing system 20 includes a laser unit and an observing unit for inspecting the surface of the mold. As the laser unit, any of various semiconductor laser diodes may be used. For example, High Light 1000F produced by Coherent Japan may be used. Alternatively, the laser beam generator disclosed in Patent Document No. 7 may also be used.

This repairing system 20 includes a plasma unit for use to carry out the second-stage atmospheric pressure plasma processing. A gas supply system is connected to the plasma unit and a reactive gas to generate plasma and other gases are supplied from the gas supply system to the plasma unit. The plasma unit may be the atmospheric pressure plasma processor 10 shown in FIGS. 6(a) and 6(b), for example. The repairing system 20 further includes a control unit for controlling the operations of the laser unit and the plasma unit.

In this repairing system 20, under the control of the control unit, first of all, a defective portion of the mold (i.e., a spot where the resin has clogged) which has been detected by the observing unit is irradiated with a laser beam using the laser unit, thereby performing the resin removing process as step (I). After that, atmospheric pressure plasma processing is carried out as step (II) using the plasma unit. The atmospheric pressure plasma processing may be carried out as in the first embodiment described above. In this manner, the mold can be repaired.

<Methods of Making Moth-Eye Mold and Moth-Eye Film>

Hereinafter, it will be described how to make a moth-eye mold as an exemplary mold to be repaired by a repairing method according to an embodiment of the present invention.

First of all, a workpiece including an aluminum film on its surface is provided. Next, if the workpiece is immersed in an acidic or alkaline electrolytic solution of sulfuric acid, oxalic acid, phosphoric acid and if a voltage is applied thereto using the workpiece as an anode (i.e., if anodization is carried out), oxidation and dissolution will advance concurrently on the surface of the workpiece. As a result, an oxide film with a huge number of nanopores is formed over its surface.

In this case, the aluminum layer that has been formed over the surface includes a lot of contamination in the air, and therefore, defects are generated there at a high percentage. For that reason, the film that has been formed through the initial anodization (which will be referred to herein as an "initial oxide film layer") is etched away entirely. After that, by repeatedly performing the anodization and etching processes a number of times, a porous alumina layer can be formed in an intended shape.

In this example, the anodization process may be carried out under the following conditions:

Distance between electrode and sample: 150 mm (where the electrode is a Pt plate);
(a) Anodization is supposed to be carried out at a process temperature of 5° C. for 1 minute using 0.05 mol/L of oxalic acid as a process solution and with a voltage of 80 V applied;
(b) Etching process is supposed to be carried out at a process temperature of 30° C. for 20 minutes using 8 mol/L of phosphoric acid as an etchant.

In this manner, a moth-eye mold, of which the surface is a porous film with a lot of recesses that have been created through the anodization, is formed. The mold may have either a roll shape as will be described later with reference to FIG. 9 or a flat plate shape.

Also, a mold releasing agent made of a fluorine-based material (which will be referred to herein as a "fluorine-based mold releasing agent) is suitably applied onto the surface of the mold. The fluorine-based mold releasing agent is a mixture of a fluorine-based compound with a mold releasing property (i.e., a fluorine-containing organic compound) and a solvent, and may also be any of various kinds of agents that are retailed generally under the name of "fluorine-based coating agents" or "fluorine-based surface treatment agents". This mold releasing agent may be applied a number of times. And the mold releasing agent may be applied by spray coating method, for example.

Hereinafter, it will be described how to form a moth-eye film using a moth-eye mold that has been either made or repaired as described above.

Figure 9:
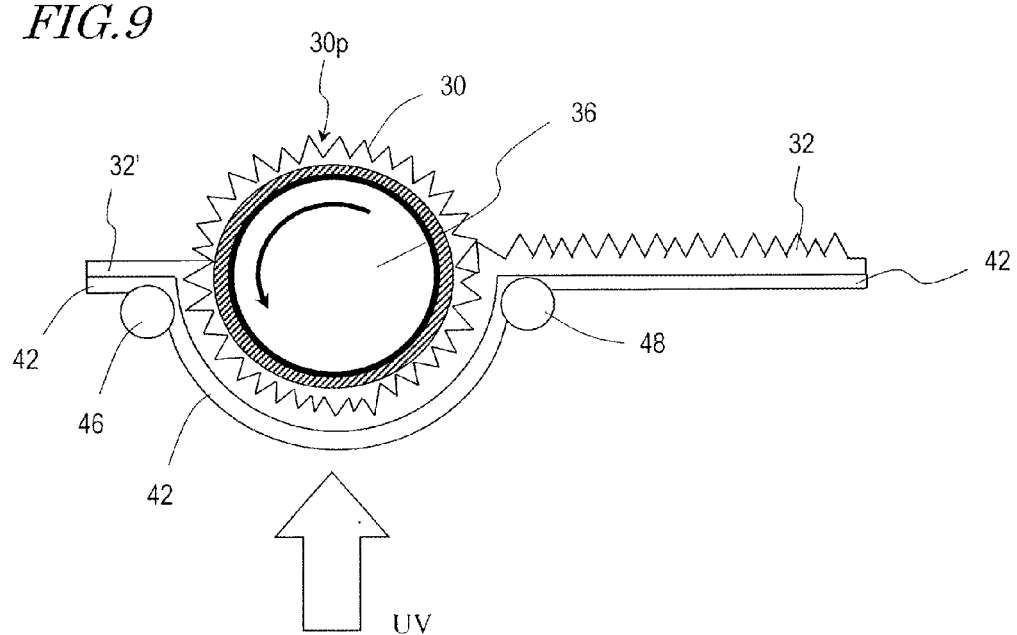
FIG. 9 A cross-sectional view illustrating how to make a moth-eye film using a mold which has been repaired by a repairing method according to an embodiment of the present invention.

FIG. 9 illustrates how a moth-eye film (which is an antireflection film) may be made by a roll-to-roll method using a moth-eye mold 30 yet to be repaired and a moth-eye mold 30 that has been repaired.

As shown in FIG. 9, a roll of moth-eye mold 30 including a porous alumina layer on its outer periphery is loaded into a roller 36, and then a workpiece 42, of which the surface is coated with a UV curable resin 32', is pressed against the moth-eye mold 30 with the UV curable resin irradiated with an ultraviolet ray (UV), thereby getting the UV curable resin 32' cured.

As the UV curable resin 32', an acrylic resin may be used, for example. The workpiece 42 may be a TAC (triacetyl cellulose) film, for example. The workpiece 42 is let out of a let-out roller (not shown) and then the UV curable resin 32' is applied onto its surface by a split coater (not shown), for example.

As shown in FIG. 9, the workpiece 42 is supported by two supporting rollers 46 and 48, which have a rotating mechanism and transport the workpiece 42. Meanwhile, the roll of moth-eye mold 30 is rotated in the direction indicated by the arrow in FIG. 9 at a rotational velocity corresponding to the transport velocity of the workpiece 42.

After that, by removing the moth-eye mold 30 from the workpiece 42, a cured layer 32, onto which the surface unevenness of the moth-eye mold 30 (i.e., an inverted moth-eye structure) has been transferred, is formed on the surface of the workpiece 42. Then, the workpiece 42 on which the cured layer 32 has been formed is reeled in a reel-in roller (not shown).

To form an antireflection film with excellent antireflection property, the nanopores $30p$ (or very small recesses) of the moth-eye mold 30 suitably have a size of 10 nm to less than 500 nm when viewed along a normal to the surface (i.e., the pitch between the respective centers of adjacent nanopores $30p$ is suitably 10 nm to less than 500 nm), and more suitably have a size of 50 nm to less than 500 nm. The nanopores $30p$ suitably have a roughly conical cross-sectional shape and have a pointed bottom. Also, the nanopores $30p$ suitably have a depth of about 10 nm to less than about 1000 nm (=1 μm).

Figure 10:
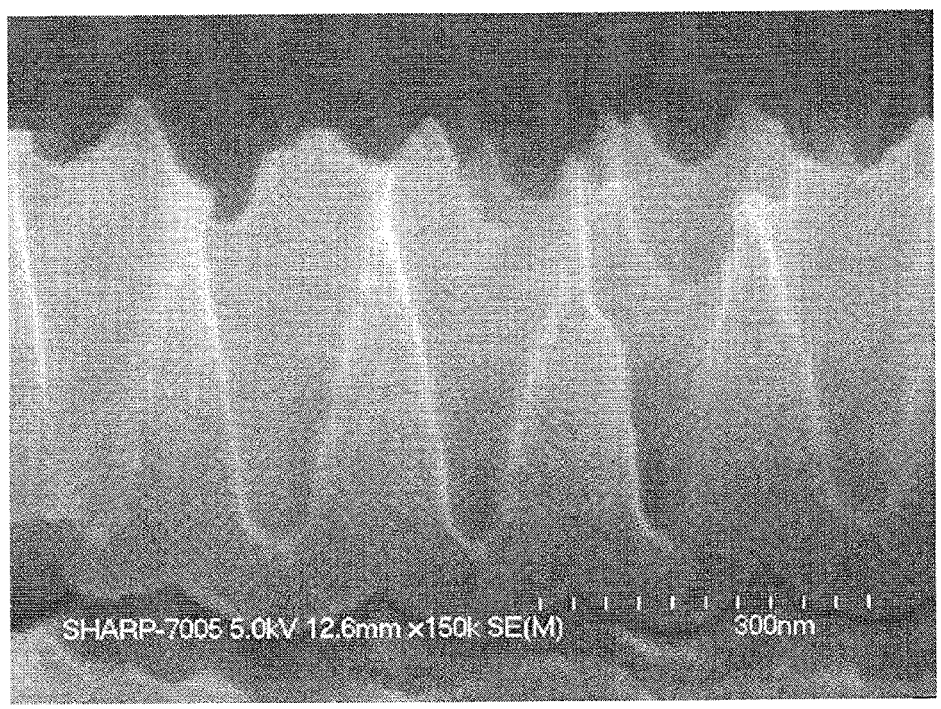
FIG. 10 Shows a cross section of a moth-eye structure formed by unevenness.

Supposing the nanopores $30p$ have a circular shape when viewed along a normal to the porous alumina layer, adjacent circles suitably overlap with each other, and a saddle portion is suitably formed (in the boundary) between adjacent nanopores $30p$. In this description, even such a film in which a regular (or irregular) unevenness pattern has been formed by a plurality of nanopores $30p$ that have been created close to each other will also be referred to herein as a "porous film". FIG. 10 shows a porous film (moth-eye structure) with such an unevenness pattern.

Even though an embodiment of the present invention has been described as a method for repairing a moth-eye mold, this is just an example and a mold repairing method according to an embodiment of the present invention can also be used to repair any other mold with a porous surface layer, not just the moth-eye mold. In addition, various kinds of functional films (which are typically antireflection films) can be made using the repaired mold. The repairing method according to an embodiment of the present invention can be used to repair a mold to make a photonic crystal, for example, and can also be used to repair a mold for use to make a wire-grid polarizer or a prism sheet.

Also, in the repairing method according to the embodiment of the present invention described above, the resin removing process is supposed to be carried out in two stages that are a first-stage process and a second-stage process. Optionally, the first-stage process may be carried out as a combination of multiple different kinds of removing processes such as a chemical treatment and a laser ablation process.

INDUSTRIAL APPLICABILITY

The present invention can be used to make any of various kinds of functional films (e.g., a moth-eye film) using a mold.

REFERENCE SIGNS LIST 2 mold
3 gas supply port
4 inner electrode
5 insulating layer
7 power supply
8 electrode unit
10 (spotted) atmospheric pressure plasma processor

The invention claimed is:

1. A mold repairing method for removing a resin material deposited on a mold, of which the surface is a porous film with a plurality of recesses that have been created through anodization, the method comprising the steps of:
   (I) removing the resin material that is exposed on the surface of the mold over the plurality of recesses without performing atmospheric pressure plasma processing; and
   (II) removing the resin material that is still left inside the plurality of recesses by the atmospheric pressure plasma processing, after the step (I) has been performed, wherein the step (I) includes removing the resin material by spraying dry ice so that the atmospheric pressure plasma processing in step (II) removes the resin material in the recesses in less than 60 minutes, wherein the mold includes an aluminum material and the porous film includes a porous alumina layer.

2. The repairing method of claim 1, wherein in the step (II), the resin material that is partially left on the mold is subjected to the atmospheric pressure plasma processing just locally.

3. The repairing method of claim 1, wherein the surface of the mold is comprised of curved surfaces.

4. The repairing method of claim 1, wherein a mold releasing agent has been applied onto the surface of the mold.

5. A method of making a functional film, the method comprising the steps of:
   providing a mold, of which the surface is a porous film with a plurality of recesses that have been created by anodization;
   imprinting the surface shape of the mold onto a photocurable resin material;
   removing, after the step of imprinting, the photocurable resin material that has been deposited on the mold; and
   imprinting, after the step of removing the resin material deposited, the surface shape of the mold onto the photocurable resin again,
   wherein the step of removing the photocurable resin material includes the steps of:
   (I) removing the resin material that is exposed on the surface of the mold over the plurality of recesses without performing atmospheric pressure plasma processing; and
   (II) removing the resin material that is still left inside the plurality of recesses by the atmospheric pressure plasma processing, after the step (I) has been performed, wherein the step (I) includes removing the resin material by spraying dry ice so that the atmospheric pressure plasma processing in step (II) removes the resin material in the recesses in less than 60 minutes, wherein the mold includes an aluminum material and the porous film includes a porous alumina layer.

6. The method of claim 5, wherein the step of providing the mold includes applying a mold releasing agent onto the surface of the porous film.

7. A mold repairing method for removing a resin material deposited on a mold, of which the surface is a porous film with a plurality of recesses that have been created through anodization, the method comprising the steps of:
   (I) removing the resin material that is exposed on the surface of the mold over the plurality of recesses without performing atmospheric pressure plasma processing; and
   (II) removing at least partially the resin material that is still left inside the plurality of recesses by the atmospheric pressure plasma processing, after the step (I) has been performed, wherein the step (I) includes removing the resin material by laser ablation, so that the atmospheric pressure plasma processing in step (II) removes the resin material in the recesses in less than 60 minutes, wherein the mold includes an aluminum material and the porous film includes a porous alumina layer.

8. The repairing method of claim 7, wherein the mold includes an aluminum material and the porous film includes a porous alumina layer.

9. The repairing method of claim 7, wherein in the step (II), the resin material that is partially left on the mold is subjected to the atmospheric pressure plasma processing just locally.

10. The repairing method of claim 7, wherein the surface of the mold is comprised of curved surfaces.

11. The repairing method of claim 7, wherein a mold releasing agent has been applied onto the surface of the mold.

12. A method of making a functional film, the method comprising the steps of:
   providing a mold, of which the surface is a porous film with a plurality of recesses that have been created by anodization;
   imprinting the surface shape of the mold onto a photocurable resin material;
   removing, after the step of imprinting, the photocurable resin material that has been deposited on the mold; and
   imprinting, after the step of removing the resin material deposited, the surface shape of the mold onto the photocurable resin again,
   wherein the step of removing the photocurable resin material includes the steps of:
   (I) removing the resin material that is exposed on the surface of the mold over the plurality of recesses without performing atmospheric pressure plasma processing; and
   (II) removing at least partially the resin material that is still left inside the plurality of recesses by the atmospheric pressure plasma processing, after the step (I) has been performed, wherein the step (I) includes removing the resin material by laser ablation, so that the atmospheric pressure plasma processing in step (II) removes the resin material in the recesses in less than 60 minutes, wherein the mold includes an aluminum material and the porous film includes a porous alumina layer.

13. The repairing method of claim 12, wherein the step of providing the mold includes applying a mold releasing agent onto the surface of the porous film.

* * * * *